US012760966B2

(12) United States Patent
Bertola et al.

(10) Patent No.: US 12,760,966 B2
(45) Date of Patent: Oct. 13, 2026

(54) APPARATUS FOR THE TREATMENT OF A CHEMICAL PRODUCT APPLIED TO SURFACES OF ITEMS

(71) Applicant: ECOSYS S.R.L., Meduna di Livenza (IT)

(72) Inventors: Massimo Bertola, Cessalto (IT); Asefaw Fessehaye, Roveredo in Piano (IT)

(73) Assignee: ECOSYS S.R.L., Meduna di Livenza (IT)

( * ) Notice: Subject to any disclaimer, the term of this patent is extended or adjusted under 35 U.S.C. 154(b) by 653 days.

(21) Appl. No.: 18/271,988

(22) PCT Filed: Dec. 28, 2021

(86) PCT No.: PCT/IB2021/062368

§ 371 (c)(1),
(2) Date: Jul. 12, 2023

(87) PCT Pub. No.: WO2022/172081

PCT Pub. Date: Aug. 18, 2022

(65) Prior Publication Data

US 2024/0085104 A1 Mar. 14, 2024

(30) Foreign Application Priority Data

Feb. 10, 2021 (IT) ........................ 102021000002936

(51) Int. Cl.
*F26B 3/28* (2006.01)
*C08F 2/46* (2006.01)
(Continued)

(52) U.S. Cl.
CPC .................. *F26B 3/28* (2013.01); *C08F 2/46* (2013.01); *F26B 15/18* (2013.01); *F26B 21/40* (2026.01)

(58) Field of Classification Search
None
See application file for complete search history.

(56) References Cited

U.S. PATENT DOCUMENTS 3,659,352 A * 5/1972 Cook ........................ F26B 9/06 34/191
6,185,840 B1 2/2001 Noelle et al.
2022/0118478 A1* 4/2022 Fessehaye ............... B08B 13/00

FOREIGN PATENT DOCUMENTS

DE 34 02 505 A1 8/1984
EP 2 808 635 A1 12/2014
(Continued)

OTHER PUBLICATIONS

Machine Translation of JP2005317922.*
(Continued)

*Primary Examiner* — Christopher T Schatz
(74) *Attorney, Agent, or Firm* — Oliff PLC

(57) ABSTRACT

The present invention relates to an apparatus for the treatment of a chemical product applied to surfaces of items. The apparatus includes: a tunnel chamber, a conveyor belt element, first injection means configured to supply an inert gas in the tunnel chamber, and radiation means configured for the treatment of the chemical product. Furthermore, the apparatus includes a suction chamber in fluid communication with the tunnel chamber, and suction means fluidly connected to the suction chamber. Specifically, the suction chamber is in fluid communication with the tunnel chamber through a plurality of through ducts formed on a wall element separating the chambers, and the conveyor belt element is provided with a plurality of through openings which pass through its thickness.

11 Claims, 8 Drawing Sheets

(51) Int. Cl.
*F26B 15/18* (2006.01)
*F26B 21/40* (2026.01)

(56) References Cited

FOREIGN PATENT DOCUMENTS

| | | | | | |
|---|---|---|---|---|---|
| GB | 2 139 060 | A | | 10/1984 | |
| IT | 201900002653 | A1 | | 8/2020 | |
| JP | 2005317922 | A | * | 11/2005 | .......... H10P 72/3202 |
| PT | 2198981 | E | | 3/2016 | |

OTHER PUBLICATIONS

Apr. 22, 2022 Search Report issued in International Patent Application No. PCT/IB2021/062368.
Apr. 22, 2022 Written Opinion of the International Searching Authority issued in International Patent Application No. PCT/IB2021/062368.

* cited by examiner

APPARATUS FOR THE TREATMENT OF A CHEMICAL PRODUCT APPLIED TO SURFACES OF ITEMS

TECHNICAL FIELD OF THE INVENTION

The present invention relates to an apparatus for the treatment of a chemical product applied to surfaces of items in controlled atmosphere. Preferably, the apparatus is configured for the treatment of a chemical product which can be photopolymerized/dried by means of radiation—in controlled atmosphere having one or more predetermined wavelengths.

State of the Prior Art

Items, preferably sheet-like, which provide for a surface layer consisting of a chemical product which is applied to confer a desired surface characteristic, such as for example a given finish, a given scratch resistance, and the like, are known in the state of the art.

Specifically, according to the field of application, sheet-like items, such as panels made of various materials (wood, metal, plastic, glass, etc. or combinations thereof), provide for a chemical product which is first applied on one or more surfaces, for example by spraying, and it is subsequently treated, for example by means of photopolymerization/drying, so as to react on the surface of the item, therefore conferring a given surface characteristic to the latter.

For example, in the field of furnishing components, some types of sheet-like items provide for a surface layer made up of a chemical product, typically acrylic-based, adapted to be subjected to a radiation treatment by an excimer emitter (xenon lamp, argon lamp, or the like) in a controlled atmosphere of inert gas (nitrogen, argon or the like) so as to confer an opaque finish and an increased scratch resistance to the surface of the item.

However, it is known that in order to obtain desired characteristics of the surface layer, it is important to carry out the treatment in an environment having a very high inert gas content by replacing the oxygen provided for in the natural atmosphere as much as possible, so as to obtain a controlled atmosphere. As a matter fact, as known, oxygen interferes with the treatment by radiating the chemical product, and the removal thereof allows to obtain excellent characteristics, such as high opacity (for example Gloss index values lower than 5) and high scratch resistance.

Document EP2198981 describes a method in which sheet-like items, coated with acrylate and methacrylate monomers and/or oligomers, are subjected to a treatment, in an inert gas controlled atmosphere, with an excimer emitter and a further medium pressure mercury emitter. In particular, the sheet-like items are conveyed—by means of a conveyor belt element—into a tunnel defining a chamber with a very high inert gas content, so as to remove the oxygen provided for in the natural atmosphere as much as possible.

However, this document does not disclose a system for providing an atmosphere with a high inert gas content. Reasonably, this condition can be obtained by highly increasing a flow of inert gas, with ensuing drawbacks relating to the danger for operators possibly exposed to high amounts of inert gas.

Furthermore, in order to obtain items with a surface characteristic that is constant over the entire surface of the item, such as a given opaque finish, it is important to expose the items to a controlled atmosphere in which the high inert gas content is homogeneously distributed and provides for turbulence-free flows, so as not to deteriorate the effectiveness of the treatment.

As a matter fact, a possible inhomogeneity of the distribution of the inert gas (adapted to replace oxygen) and the presence of turbulence induce an undesired inhomogeneity of the treatment of the chemical product by means of the excimer emitter, forming—as a result—areas with inhomogeneous surface characteristics on the items. This problem is particularly relevant if the apparatus provides for large dimensions of the chamber in which the treatment is carried out, in order to allow the processing of a large number of items.

Document WO20174352 describes an apparatus for opacifying a chemical product applied to sheet-like items. The apparatus is provided with an inert gas injection station and an excimer treatment station. In particular, the sheet-like items are conveyed toward said stations by means of a conveyor belt element which provides for V-shaped portions. In particular, with this configuration, at the V-shaped portions there is an increase in the size of the chamber which allows a better distribution of the inert gas, improving the effectiveness of the treatment.

However, this construction is complex and it is difficult to guarantee a constant treatment as process parameters change. For example, upon changing the speed for transporting the items in order to increase the productivity of the apparatus, it is difficult to correct the inert gas flow settings in order to guarantee the constancy of the surface characteristic which can be obtained with the treatment also due to the turbulence induced by the increase in speed.

Furthermore, the V-shaped portions along the conveyor belt element promote the formation of inert gas flow turbulence which deteriorate the treatment effectiveness. In particular, the turbulence induce defects on the surfaces of the items, such as for example areas with inhomogeneous surface characteristics, as mentioned above.

Therefore, there arises the need to provide a solution which overcomes the drawbacks described above.

SUMMARY OF THE INVENTION

The task of the present invention is to provide an apparatus adapted to effectively and reliably carry out the treatment of a chemical product applied to surfaces of items, in an inert gas controlled atmosphere.

In the context of the task outlined above, an object of the present invention relates to an apparatus adapted to provide a controlled atmosphere with a high inert gas percentage content.

A further object relates to an apparatus adapted to provide a controlled atmosphere in which there is provided for a homogeneous inert gas distribution inside the chamber in which the items are treated.

A further object relates to an apparatus adapted to provide a controlled atmosphere in which turbulence of the inert gas flow inside the chamber in which the items are treated is reduced or eliminated.

A further object relates to an apparatus whose construction allows wide ranges of setting of the process parameters, so as to easily optimise them depending on the production requirements, while maintaining an effective and reliable treatment of the items.

A further object relates to an apparatus whose construction allows wide and simple design possibilities.

The aforementioned task and objects, as well as others which will be more apparent from the following description, achieved by means of an apparatus for the treatment of a chemical product applied to surfaces of items, as defined in the independent claim. Further details are defined in the dependent claims.

BRIEF DESCRIPTION OF THE FIGURES

The further characteristics and advantages of the apparatus for the treatment of a chemical product applied to surfaces of items according to the present invention will become more evident in the following description regarding preferred embodiments provided purely by way of non-limiting example, with reference to the following figures, wherein.

DETAILED DESCRIPTION OF THE INVENTION

In the description below, terms such as “above”, “below”, “horizontal”, “vertical”, “right”, “left” and the like refer to an apparatus according to the present invention, in the standard use configuration, as shown in the attached drawings.

Figure 1:
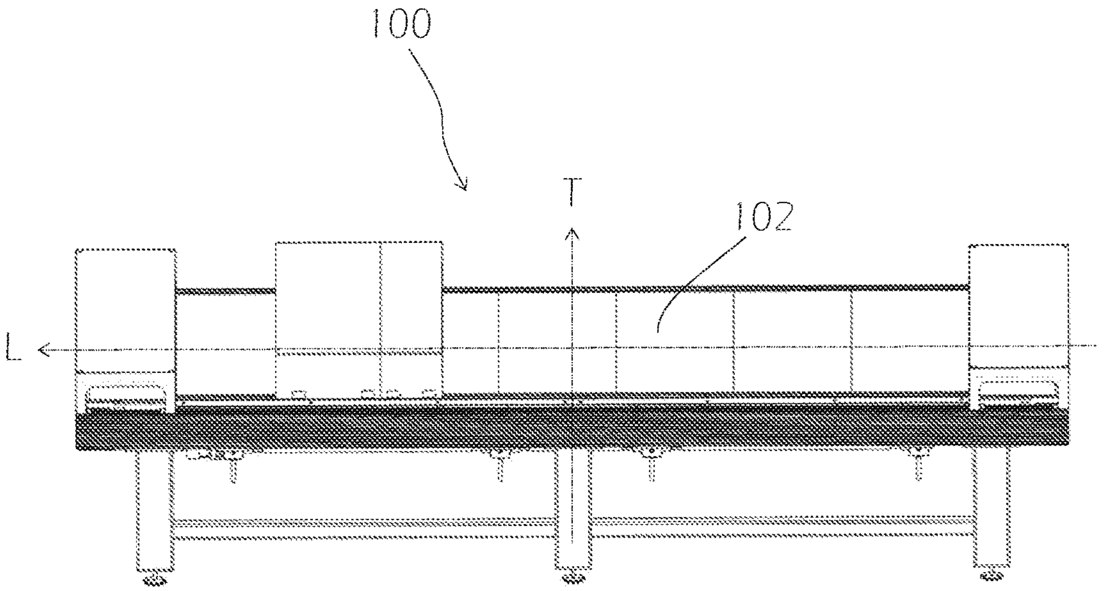
FIG. 1 is a perspective view of an apparatus according to a first preferred embodiment of the present invention.
Figure 2:
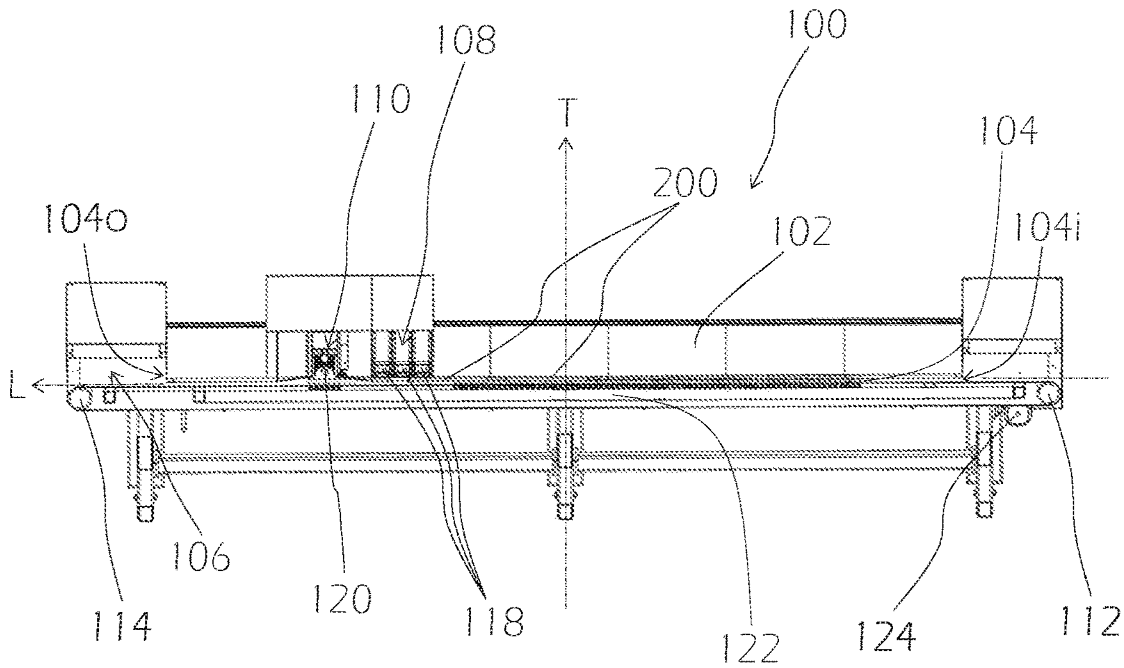
FIG. 2 is a cross-sectional perspective view of the apparatus of FIG. 1.

FIGS. 1 and 2 respectively show a perspective view and a cross-sectional perspective view of an apparatus 100 in a first preferred embodiment, according to the present invention.

The apparatus 100 is configured for the treatment, in an inert gas controlled atmosphere, of a layer made of a chemical product applied to surfaces of items 200 which advance inside the apparatus 100 along a longitudinal direction L substantially parallel to the horizontal plane on which the apparatus 100 lies (the longitudinal direction L is indicated in the figures using a two-dots-dashed arrow).

In particular, the items 200 each have an outer surface (not numbered in the drawings) to which there is applied a layer of said chemical product (not numbered in the drawings), adapted to be treated using the apparatus 100 so as to confer a given surface characteristic to the items 200.

In the preferred embodiment, the items 200 are panels formed with materials of various types (wood, metal, plastic, glass, or the like) on whose surfaces a chemical product which can be photopolymerized/dried is applied previously, for example by spraying, possibly subjected to gelling by means of known techniques. In particular, the apparatus 100 is configured to treat, in an inert gas controlled atmosphere, said chemical product by means of radiation having one or more predetermined wavelengths adapted to induce the photopolymerization/drying (treatment of the chemical product) thereof so as to confer a given surface characteristic to the panel 200.

In the most preferred embodiment, the chemical product which can be photopolymerized/dried is an acrylic monomers/oligomers-based substance which is contained in a solvent together with a photo-initiator adapted to trigger the photopolymerization. In particular, such chemical product which can be photopolymerized/dried is subjected to—in the apparatus 100—a radiation treatment by an excimer emitter (xenon lamp, argon lamp, or the like) in a controlled atmosphere of inert gas (nitrogen, argon or the like) so as to confer a highly opaque finish (for example having Gloss index values lower than 5) and an increased scratch resistance to the surface of the item 200. However, this selection shall not be deemed as limiting, and the type of chemical product and radiation emitter can be suitably selected to confer a given surface characteristic to the items 200.

With reference to FIGS. 1 to 6, the apparatus 100 comprises a covering element 102 defining a tunnel chamber 104. The items 200 are transported through the tunnel chamber 104 by means of a conveyor belt element 106 along the longitudinal direction L, that is along a direction of advancement which goes from right to left in the figures. Furthermore, the apparatus 100 comprises first injection means 108 configured to supply an inert gas in the tunnel chamber 104, and radiation means 110 configured for the treatment by means of radiation, inside the tunnel chamber 104, of the chemical product applied to the surfaces of the items 200.

The covering element 102 is adapted to substantially insulate the items 200 from the external natural atmosphere (having as its main gases: nitrogen about 78 vol %, oxygen 21 vol %, and argon 1 vol %) so as to maintain them in a controlled atmosphere which is obtained inside the tunnel chamber 104, as explained in greater detail below. The conformation and structure of the covering element 102 are selected for example based on the shape of the items 200 and the dimensions of the conveyor belt element 106. In the preferred embodiment, the covering element 102 comprises a plurality of shaped sections shaped to form an inverted “U” to cover the entire transversal extension of the conveyor belt element 106, that is, the width thereof, and which are arranged side by side along the longitudinal direction L so as to define said tunnel chamber 104. However, this selection shall not be deemed as limiting, and the covering element 102 may provide for further adapted constructions.

The tunnel chamber 104 extends along the longitudinal direction L and it comprises an inlet **104*i* and an outlet 104*o* for the items 200. As a matter fact, the apparatus 100 is generally inserted along a production line which can provide for further steps for treating the items 200, and which are carried out upstream and/or downstream of the apparatus 100. For example, a production line may provide for a step for spraying—on the items 200—the chemical product and a step for gelling the latter, carried out upstream of the apparatus 100, and/or a drying step, carried out downstream of the apparatus 100. However, this selection shall not be deemed as limiting, and possible further treatment steps upstream and/or downstream of the apparatus 100** may be of various types.

The conveyor belt element 106 is configured to allow, by means of known constructions, the advancement of the items 200 inside the tunnel chamber 104 along the longitudinal direction L. In the present preferred embodiment, the conveyor belt element 106 has a closed belt configuration comprising an upper advancement portion 106*f* and a lower return portion 106*r* connected in succession to each other forming a flexible endless belt which is driven by end rollers, 112 and 114, one of whose rollers is motor-driven while the other roller is idle.

With this configuration, the items 200 are arranged to rest substantially at the inlet 104*i* on the advancement portion 106*f* of the conveyor belt element 106, and they are then transported through the tunnel chamber 104 along the longitudinal direction L toward the outlet 1040.

In particular, according to the present invention, the conveyor belt element 106 is provided with a plurality of through openings 116 which pass through the thickness thereof (better visible in FIGS. 4, 5, and 6), and whose function will be explained below. In other words, the opposite faces of the belt defining the conveyor belt element 106 are in fluid communication with each other through said plurality of through openings 116.

The through openings 116 are preferably formed along the entire longitudinal and transversal extension of the conveyor belt element 106 and, even more preferably, according to a regular pattern, so as to confer a homogeneous degree of fluid communication through the conveyor belt element 106, as better explained below.

Furthermore, the through openings 116 have shape and size that are selected for example based on the shape/size of the items 200, the size of the conveyor belt element 106, and the volume of the tunnel chamber 104, so as to adjust a degree of fluid communication therethrough.

In the present preferred embodiment, the through openings 116 are circular through holes having a diameter of from 2 to 10 mm formed along the entire longitudinal and transversal extension of the conveyor belt element 106, defining a rhombus pattern. However, this selection shall not be deemed as limiting and the shape, size, orientation, and pattern of the through openings 116 may be suitably varied. For example, in a further embodiment, the through openings 116 are through slits rather than circular through holes.

The first injection means 108 are arranged downstream of the inlet 104*i*, with respect to the transport direction of the items 200 in the tunnel chamber 104, so as to supply inert gas, such as preferably nitrogen, argon or the like, along the path of the items 200 inside the tunnel chamber 104.

Preferably, the first injection means 108 are configured so as to allow an adjustment of parameters of the flow of inert gas which is injected into the tunnel chamber 104, such as for example amount, rate, direction, and the like.

The first injection means 108 may provide for any adapted construction, and in the present embodiment it comprises three bar elements 118 configured to supply inert gas, for example gaseous nitrogen, inside the tunnel chamber 104. The bar elements 118 are arranged perpendicularly to the direction of advancement of the items 200, that is along a transversal direction T orthogonal to the longitudinal direction L (the transversal direction is better visible in FIGS. 1 and 2 with a two-dots-dashed arrow), so as to supply inert gas preferably along the entire transversal extension, that is the entire width, of the conveyor belt element 106.

The number of the bar elements 118, the mutual distance thereof along the longitudinal direction L, and the arrangement thereof with respect to the inlet 104*i*, are selected so as to suitably adjust, at the design stage, the distribution characteristics of the inert gas inside the tunnel chamber 104.

In the present embodiment, said bar elements 118 supply the inert gas inside the tunnel chamber 104 preferably through hole grids 119 (better visible in FIG. 5) having a structure/shape/size selected so as to further adjust, at the design stage, the distribution characteristics of the inert gas inside the tunnel chamber 104.

Downstream of the first injection means 108, toward the outlet 1040 of the tunnel chamber 104, there are arranged the radiation means 110 which are configured to irradiate the surface of the item 200 on which the chemical product is applied.

The radiation means 110 are suitably selected to induce photopolymerization/drying of the chemical product (treatment of the chemical product) so as to confer a given surface characteristic to the item 200. Specifically, under the operating conditions, the item 200 is transported, by means of a conveyor belt element 106, toward the radiation means 110 which emit a radiation having one or more predetermined wavelengths adapted to induce the photopolymerization/drying of the chemical product in an inert gas controlled atmosphere.

Preferably, the radiation means 110 comprise a radiation emitter 120 which emits the radiation at predetermined wavelength/s to carry out the treatment of the chemical product applied to the surfaces of the items 200. In particular, according to the present invention, the treatment must be carried out in a controlled atmosphere, different from the natural one, which is enriched with inert gas (nitrogen, argon or the like) so as to substantially remove the oxygen coming from the natural atmosphere.

In the most preferred embodiment, the radiation emitter 120 is an excimer lamp (xenon lamp, argon lamp, or the like) in which the radiation is generated by the spontaneous emission of excimers. Specifically, excimer lamp 120 allows to carry out an opacifying treatment of the chemical product in a controlled atmosphere of inert gas (nitrogen, argon or the like) so as to confer a highly opaque finish (for example having Gloss index values lower than 5) and an increased scratch resistance to the surface of the item 200. In this embodiment, the wavelength emitted by the excimer lamp is comprised between 165 and 200 nm, more preferably 172 nm, which is produced by a xenon lamp. However, the radiation means 110 may comprise one or more excimer lamps 120 which emit the same or more different wavelengths which are in the comprised range between 165 and 200 nm.

In a further preferred embodiment, the radiation emitter 120 is a UV lamp which emits a wavelength comprised between 365 and 420 nm for drying the chemical product applied to the surfaces of the items 200.

In a further preferred embodiment, the radiation emitter 120 is a radiation source having emission in the ultraviolet spectral region comprised between 100 and 420 nm to carry out a suitable treatment of the chemical product applied to the surfaces of the items 200.

However, it is clear that these selections shall not be deemed as limiting, and the radiation means 110, that is, the radiation emitter 120, may be suitably selected based on the type of chemical product to be treated and the characteristics desired to be obtained on the surfaces of the items 200.

The radiation means 110 may provide for any adapted construction, and in the present embodiment they comprise a tubular radiation emitter 120 which is arranged perpendicularly to the direction of advancement of the items 200, that is along the transversal direction T orthogonal to the longitudinal direction L, so as to provide radiation preferably along the entire transversal extension, that is, the entire width, of the conveyor belt element 106.

According to the present invention, below the conveyor belt element 106 on which the items 200 rest, the apparatus 100 comprises a suction chamber 122 in fluid communication with the tunnel chamber 104 and, furthermore, suction means 124 fluidly connected to said suction chamber 122.

This condition allows to continuously suction the gases contained therein from the tunnel chamber 104 by means of the suction means 124, such as a vacuum pump, through the suction chamber 122. In other words, the suction chamber 122 is interposed in fluid communication between the tunnel chamber 104 and the suction means 124.

In particular, the suction chamber 122 and the suction means 124 are adapted to remove the gases contained in the tunnel chamber 104 so as to guarantee in the latter a controlled atmosphere thanks to the continuous supply of inert gas by means of the first injection means 108. As a matter fact, in the use conditions, the oxygen contained in the natural atmosphere continuously enters from the inlet 104*i* into the tunnel chamber 104, even thanks to the items 200 which, moving along the direction of advancement, substantially act as blades which draw the natural atmosphere from the external toward the internal of the tunnel chamber 104. Then, the first injection means 108 supply the inert gas continuously, with a suitable flow, diluting the natural atmosphere (containing oxygen) which flows into the tunnel chamber 104. At the same time, the suction chamber 122 and the suction means 124 continuously remove the gases contained in the tunnel chamber 104 (injected inert gas and natural atmosphere) obtaining—in the latter—the enrichment of inert gas by means of the appropriate flow coming from the first injection means 108 which is set to saturate the tunnel chamber 104. In this state, oxygen is substantially completely removed from the tunnel chamber 104, so as to obtain a controlled atmosphere.

The suction chamber 122 has conformation and structure which are selected for example based on the dimensions of the tunnel chamber 104 and the dimensions of the conveyor belt element 106. In the present preferred embodiment, the suction chamber 122 is defined by a hollow box-like structure 126 which is arranged between the advancement portion 106*f* and the return portion 106*r* of the conveyor belt element 106. In particular, the suction chamber 122 is sized so as to have a transversal dimension substantially corresponding to the width of the conveyor belt element 106, and a longitudinal dimension substantially corresponding to that of the tunnel chamber 104.

Figure 4:
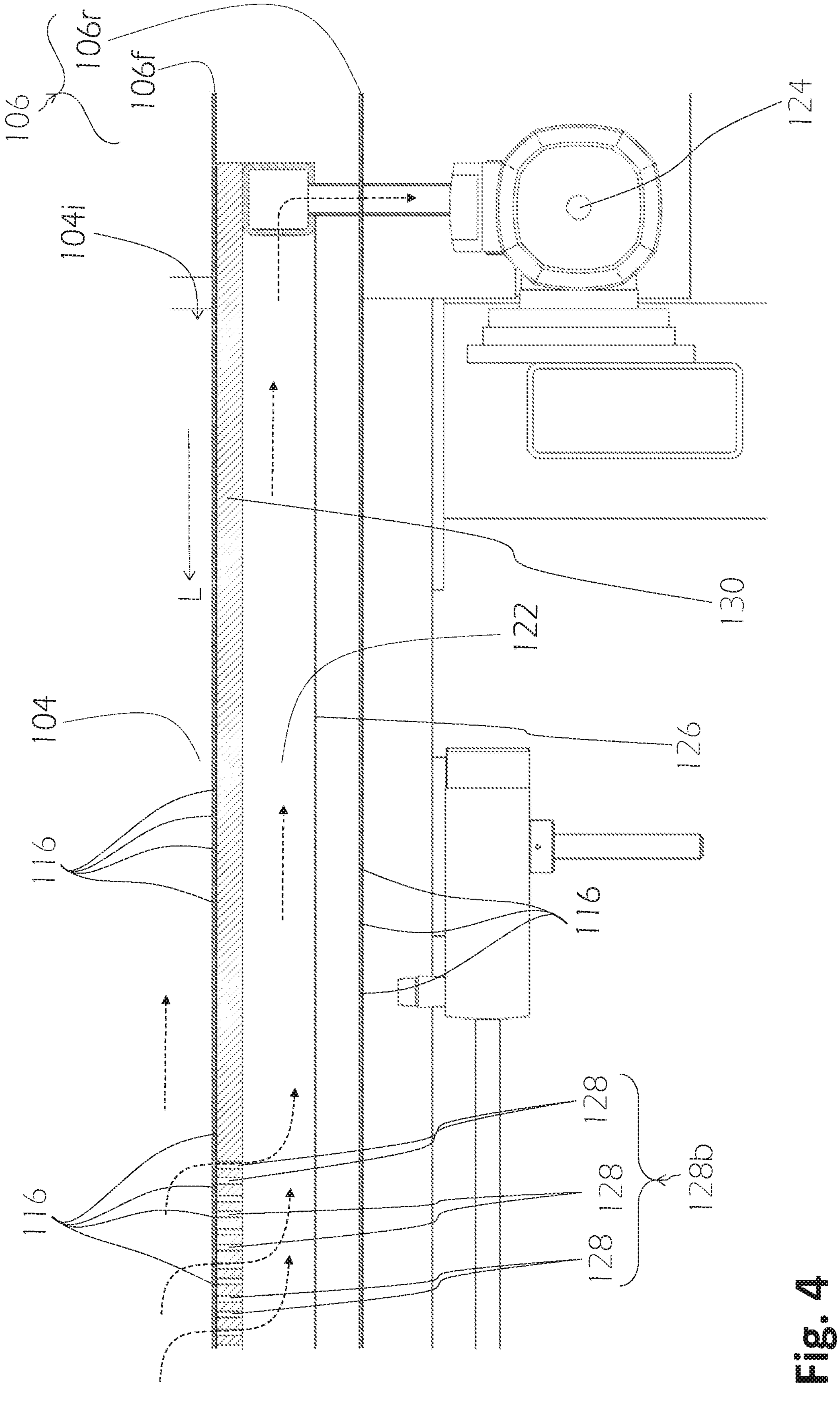
FIG. 4 is an enlarged view of an area indicated with the letter “A” in FIG. 3.
Figure 5:
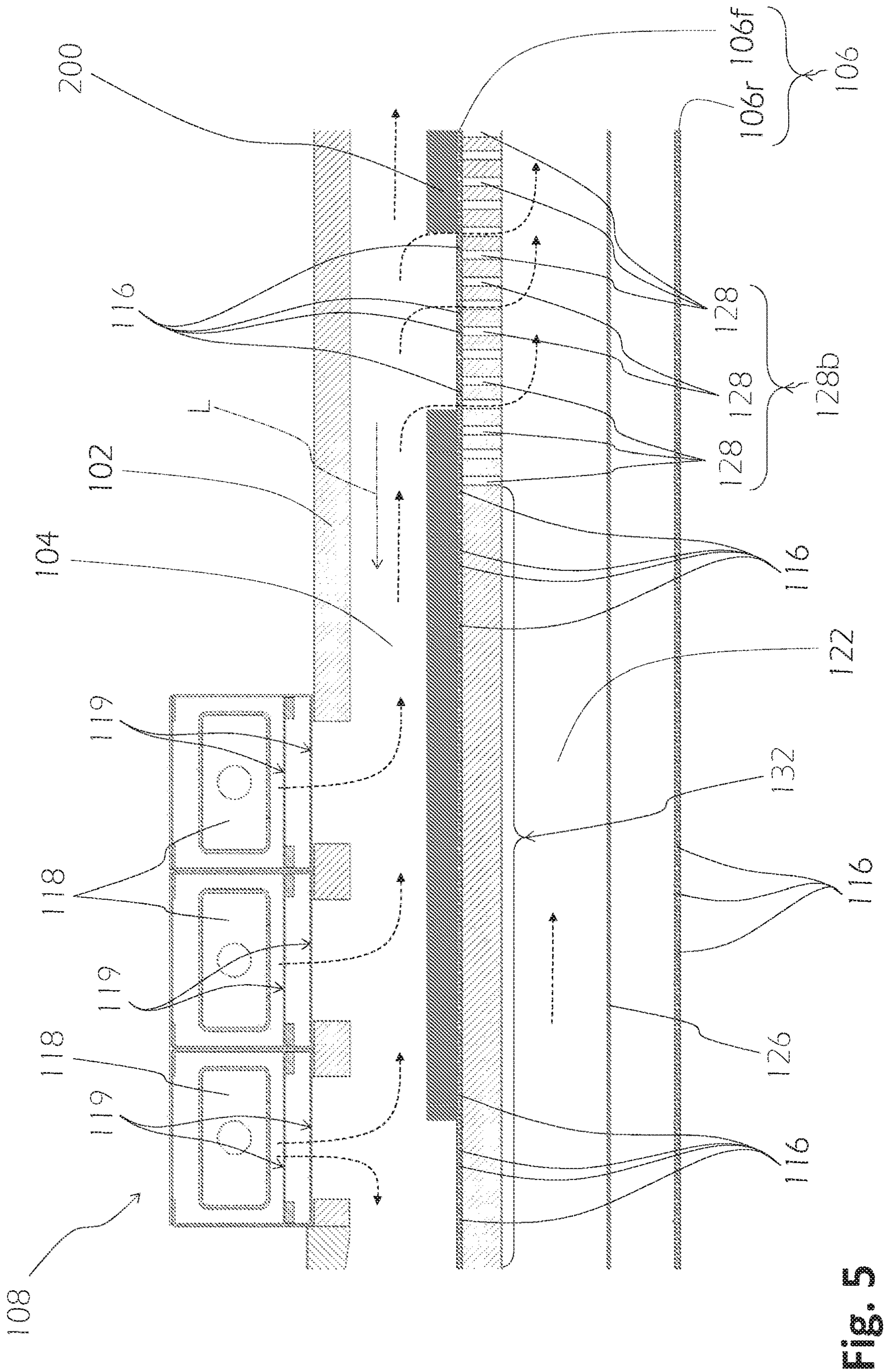
FIG. 5 is an enlarged view of an area indicated with the letter “B” in FIG. 3.
Figure 6:
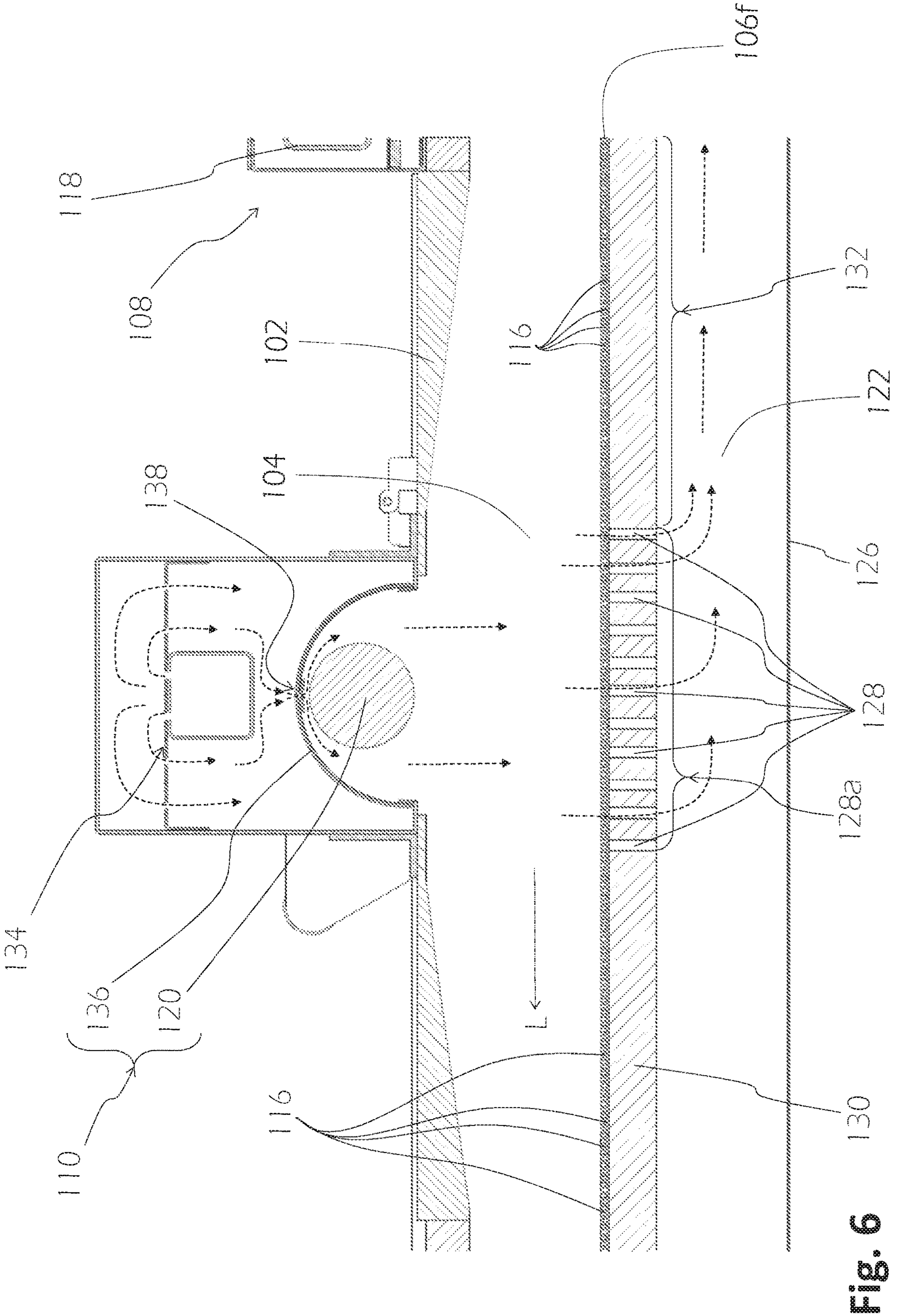
FIG. 6 is an enlarged view of an area indicated with the letter “C” in FIG. 3.

According to the present invention, the suction chamber 122 is in fluid communication with the tunnel chamber 104 through a plurality of through ducts 128 formed on a wall element 130 defining said suction chamber 122 (the through ducts 128 are better visible in FIGS. 4, 5, and 6).

In particular, the suction chamber 122 is configured so that the wall element 130 separates said suction chamber 122 from said tunnel chamber 104. In other words, the opposite faces of the wall element 130, which face respectively toward the tunnel chamber 104 and the suction chamber 122, are in fluid communication with each other through said plurality of through ducts 128.

Furthermore, the wall element 130 is arranged so that said conveyor belt element 106 is operatively at least partially interposed between said items 200 and said plurality of through ducts 128. In other words, the conveyor belt element 106 is adapted to slide over the wall element 130 and, at the plurality of through ducts 128, it is interposed between the latter and the items 200 that it transports. In particular, the wall element 130 is arranged so that the conveyor belt element 106, or preferably the advancement portion 106*f* thereof, is operatively adapted to slide at least partly on the wall element 130 and, at the plurality of through ducts 128, it is interposed between the latter and the items 200 that it transports. As a result, given the conveyor belt element 106 is provided with said plurality of through openings 116 which pass through the thickness thereof, at least a part of the gases present in the tunnel chamber 104 is suctioned into the suction chamber 122 by means of the suction means 124 through the plurality of through openings 116 of the conveyor belt element 106 and the plurality of through ducts 128 of the wall element 130. In the present embodiment, the advancement portion 106*f* of the conveyor belt element 106 is operatively at least partially interposed between the items 200 that it transports and said plurality of through ducts 128, that is between the items 200 and the wall element 130.

The plurality of through ducts 128 is preferably formed along the entire transversal extension of the wall element 130 and, even more preferably, according to a regular pattern, so as to guarantee homogeneity and regularity of fluid communication between the tunnel chamber 104 and the suction chamber 122.

Furthermore, the through ducts 128 have shape and size that are selected for example based on the volume of the tunnel chamber 104, the volume of the suction chamber 122, and the dimensions of conveyor belt element 106, so as to adjust a degree of fluid communication therethrough.

In the present preferred embodiment, ducts, the through ducts 128 are circular holes having a diameter of from 2 to 10 mm formed along the entire transversal extension of the wall element 130 defining a rhombus pattern. However, this selection shall not be deemed as limiting and the shape, size, orientation and pattern of the through ducts 128 may be suitably varied.

Therefore, in the treatment process carried out by the apparatus 100, the items 200 enter into the tunnel chamber 104, through the inlet 104*i*, and they are transported along the longitudinal direction L, by means of the conveyor belt element 106. In the tunnel chamber 104 the first injection means 108 continuously supply the inert gas, with a suitable flow, so as to dilute the natural atmosphere and remove oxygen from the surfaces of the items 200, on which the chemical product is applied, blowing against them. At the same time, when transporting the items 200 inside the tunnel chamber 104, the suction chamber 122 and the suction means 124 continuously remove the gases contained in the tunnel chamber 104 (injected inert gas and natural atmosphere containing oxygen) obtaining—in the latter—the enrichment of inert gas by means of the appropriate flow coming from the first injection means 108 which is set to saturate the tunnel chamber 104. In this state, oxygen is substantially completely removed from the surfaces of the items 200 and from the tunnel chamber 104, therefore obtaining a controlled atmosphere. When the items reach the area of the tunnel chamber 104 corresponding to the radiation means 110, the latter irradiate the surfaces of the items 200 so as to treat, in a controlled atmosphere, the chemical product conferring a given surface characteristic to the items 200. The items 200 subsequently exit the tunnel chamber 104, through the outlet 1040.

Advantageously, in this state, a controlled atmosphere is obtained in an effective and reliable manner thanks to the continuous supply of inert gas by means of the first injection means 108 and the simultaneous continuous removal of oxygen from the surfaces of the items 200 and from the tunnel chamber 104, allowing the enrichment of inert gas in the latter. In particular, the construction of the apparatus 100 confers an increased homogeneity and regularity of the gas flows inside the tunnel chamber 104 allowing an effective and reliable treatment of the chemical product applied to the surface of the items 200 by means of the radiation means 110 in controlled atmosphere.

As a matter fact, suitably selecting the inert gas supply characteristics (by means of first injection means 108) and the suction characteristics (by means of the plurality of through openings 116, the plurality of through ducts 128, the suction chamber 122 and the suction means 124), allows to adjust and maintain a high inert gas percentage content so as to remove oxygen which, under conditions of use, inevitably enters continuously from the inlet 104*i* of the tunnel chamber 104.

Furthermore, the continuous suction of the gases, by means of the suction means 124 through the plurality of through openings 116 of the conveyor belt element 106 and the plurality of through ducts 128 of the wall element 130, allows to obtain a homogeneous distribution of the high inert gas content inside the tunnel chamber 104. In particular, with this configuration the oxygen flowing in from the inlet 104*i* is effectively removed and it is unlikely that it can reach the area of the tunnel chamber 104 in which the radiation means 110 act even when the process parameters, such as the speed for transporting the items 200 by means of the conveyor belt element 106, are widely varied.

Advantageously, it should be observed that the number and the position of the plurality of through ducts 128, with respect to the tunnel chamber 104, may be widely selected to obtain a desired homogeneous distribution of the high inert gas content, that is an effective removal of oxygen.

Furthermore, with reference to FIGS. 4 to 6 in which the gas flow is indicated with dashed arrows, the continuous suction of the gases, by means of the suction means 124 through the plurality of through openings 116 of the conveyor belt element 106 and the plurality of through ducts 128 of the wall element 130, reduces the probability of generating turbulence inside the tunnel chamber 104. In particular, although the items 200 are in motion, a preferential gas flow path, which remains regular by sliding on the surfaces of the items 200 and being directed below the latter toward the suction chamber 122 in the areas corresponding to the through ducts 128 so as to render, therefore, the formation of turbulence in tunnel chamber 104 unlikely, is induced with this configuration. The absence of turbulence is advantageously guaranteed even when the process parameters, such as the speed for transporting the items 200 by means of the conveyor belt element 106 or the rate of the inert gas flow from the first injection means 108 are widely varied.

Preferably, particularly with reference to FIGS. 3 to 6, the first injection means 108 are arranged upstream of the radiation means 110, with respect to the transport direction of the items 200 in the tunnel chamber 104.

In this state, a controlled atmosphere, substantially free of oxygen, is effectively and reliably guaranteed before the chemical product is treated by means of the radiation means 110. In particular, with this configuration, the inert gas flow flows on the surfaces of the items 200 on which the chemical product is applied, so as to effectively remove oxygen which would otherwise deteriorate the treatment carried out by means of the radiation means 110.

In a preferred embodiment, the plurality of through ducts 128 is arranged upstream of the radiation means 110, with respect to the transport direction of items 200 in the tunnel chamber 104.

In this state, a gas flow is guaranteed in the tunnel chamber 104 operatively having a preferential direction which is substantially opposed to the direction of advancement of the items 200, making the removal of oxygen from the surfaces of the latter by means of the inert gas supplied by the first injection means 108 extremely effective.

Preferably, particularly with reference to FIGS. 4 to 6, the wall element 130 is configured so that the plurality of through ducts 128 comprises a first ducts group 128*a*, which is formed by the through ducts 128 which are substantially arranged at the or slightly upstream of the radiation means 110, and at least one second ducts group 128*b*, which is distinct from said first ducts group 128*a*.

In this state, a controlled atmosphere, substantially free of oxygen, is advantageously effectively and reliably guaranteed at the area of the tunnel chamber 104 in which the chemical product is treated by means of the radiation means 110. In particular, with this configuration the inert gas flow flows on the surfaces of the items 200 on which the chemical product is applied, so as to remove oxygen at the area of the tunnel chamber 104 in which the chemical product is treated by means of radiation means 110 more effectively.

Figure 3:
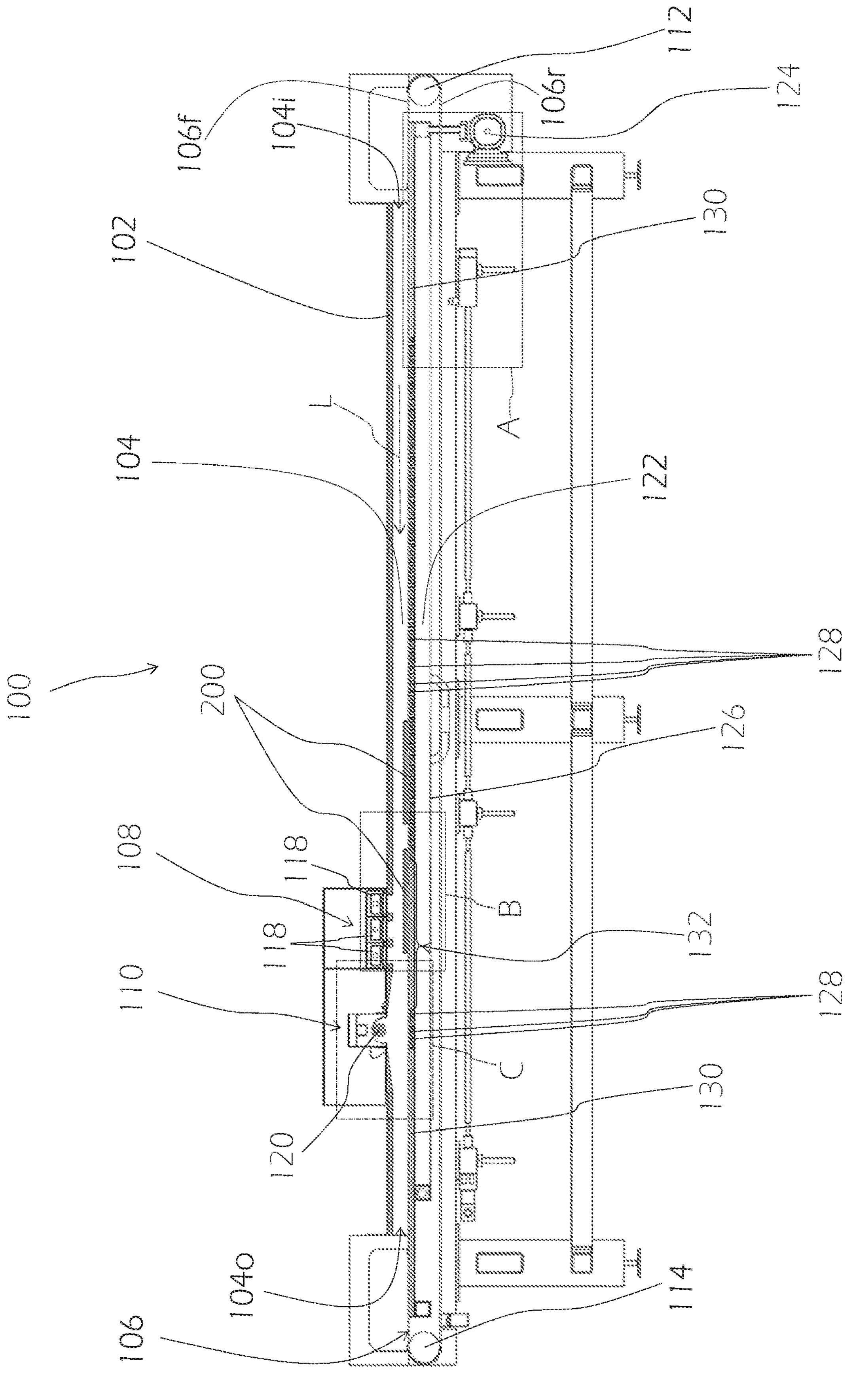
FIG. 3 is a longitudinal cross-section of the apparatus of FIG. 1.

Preferably, the wall element 130 is configured so that said second ducts group 128*b* is arranged upstream of the first injection means 108 and, furthermore, it is separated from said first ducts group 128*a* from a continuous wall portion 132 of the wall element 130 which is without through ducts 128 (the continuous wall portion 132 is better visible in FIGS. 3, 5 and 6).

In this state, a controlled atmosphere, substantially free of oxygen, is advantageously effectively and reliably guaranteed at the area of the tunnel chamber 104 in which the chemical product is treated by means of the radiation means 110. In particular, with this configuration, an inert gas flow which flows substantially entirely along the longitudinal direction L is induced at the continuous wall portion 132 with this configuration. Therefore, an inert gas flow which flows parallel to the larger surfaces of items 200, preferably sheet-like, is obtained at the continuous wall portion 132 so as to remove the possible residual oxygen left on the chemical product more effectively. In particular, the possible residual oxygen is removed and subsequently suctioned into the suction chamber 122 also through the first ducts group 128*a* before the item 200 reaches the area of the tunnel chamber 104 in which the chemical product is treated by means of the radiation means 110.

Preferably, with reference to FIG. 6, the apparatus 100 further comprises second injection means 134, also configured to supply the inert gas into the tunnel chamber 104, and the radiation means 110 also comprise, besides the radiation emitter 120, a reflector element 136 adapted to reflect the radiation from the radiation emitter 120 toward the surfaces of the items 200 on which the chemical product is applied.

In particular, according to this preferred embodiment, the reflector element 136 is interposed between the radiation emitter 120 and the second injection means 134 and, furthermore, it provides for passage means 138 configured to allow the inert gas to flow into the tunnel chamber 104 through the reflector element 136.

In this state, a controlled atmosphere, substantially free of oxygen, is further advantageously effectively and reliably guaranteed at the area of the tunnel chamber 104 in which the chemical product is treated by means of the radiation means 110. In particular, with this compact configuration, an additional inert gas flow, adapted to remove oxygen from the surfaces of the items 200 on which the chemical product is applied precisely at the area of the tunnel chamber 104 in which the chemical product is treated by means of the radiation means 110 more effectively is provided for.

Furthermore, this configuration supplies, by means of the second injection means 134, a gas flow for cooling the radiation emitter 120, advantageously guaranteeing an increased reliability of operation of the latter.

It is clear that the present invention can be obtained through other embodiments, without departing from the scope claimed.

Described below are further embodiments of the present invention which provide for modifications relating to some elements the apparatus 100. Therefore, the elements that are substantially unchanged and which serve the same functions will not be described again and the same reference numerals will be used.

Figure 7:
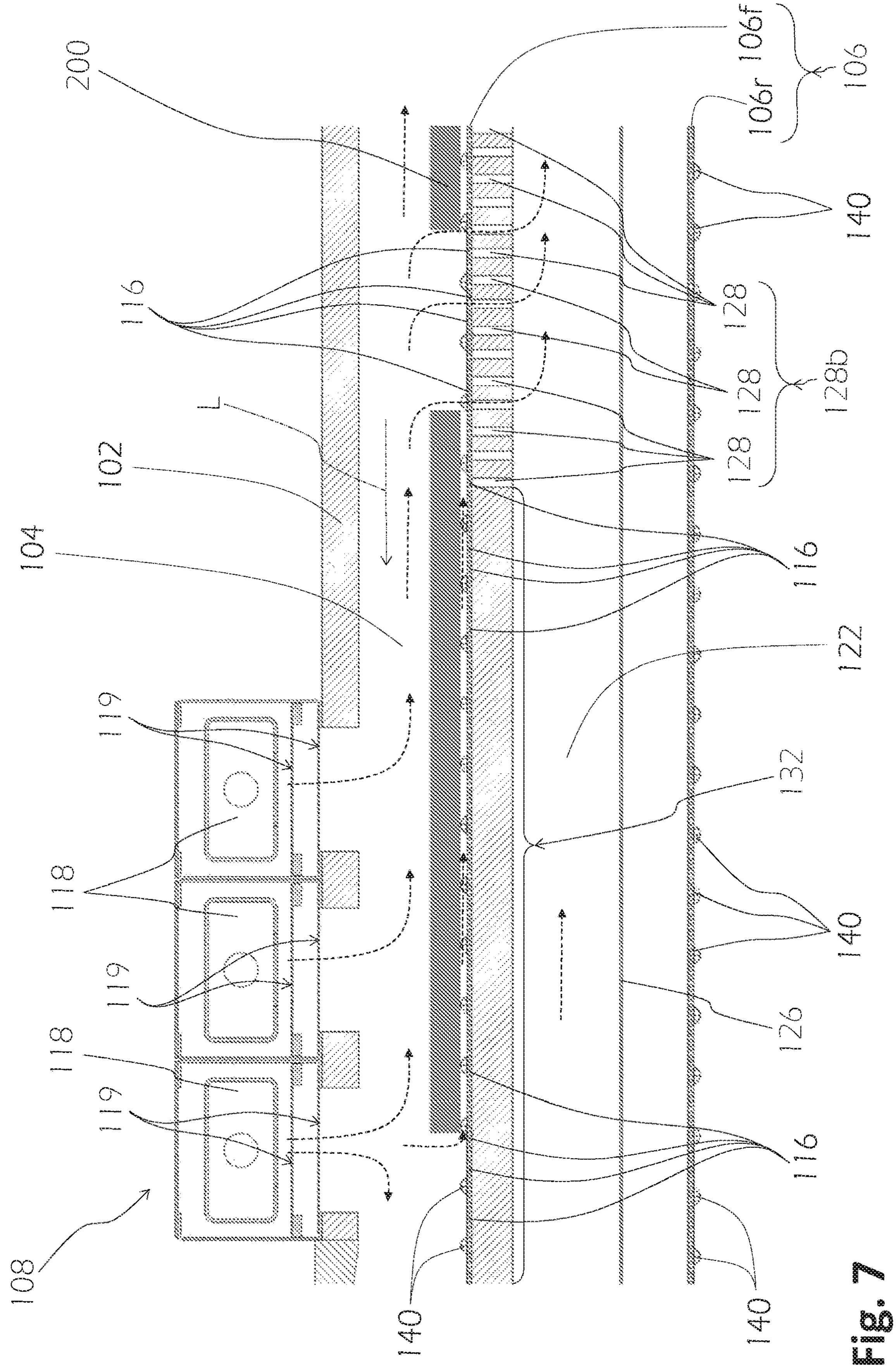
FIG. 7 is an enlarged view of an area of a longitudinal cross-section of an apparatus according to a second preferred embodiment of the present invention.

FIG. 7 shows an enlarged view of a longitudinal cross-section of an apparatus 100, in a second embodiment, which is similar to the enlarged view shown in FIG. 5, of the first embodiment, except for the structure of the conveyor belt element 106. In particular, in this second preferred embodiment, the conveyor belt element 106 comprises a plurality of protruding elements 140 distinct from each other. The protruding elements 140, preferably substantially hemispherical-shaped, extend from the surface of the conveyor belt element 106 so as to operatively support the items 200 keeping them spaced from said plurality of through openings 116.

The protruding elements 140 are preferably formed along the entire longitudinal and transversal extension of the conveyor belt element 106 and, even more preferably, according to a regular pattern.

However, it is clear that the protruding elements 140 may provide for shape, size, pattern which are suitably selected for example based on the shape/size of the items 200 and on the dimensions of the conveyor belt element 106.

In this state, a homogeneous inert gas distribution and an absence of turbulence are advantageously further guaranteed, given that the items 200 do not close the through openings 116, allowing an increased homogeneity of the suction of the gases from the tunnel chamber 104. In particular, with this configuration the gas flow may substantially flow even between the items 200 and the conveyor belt element 106 on which they rest (as shown by the dashed arrows in FIG. 7).

This solution is particularly advantageous for items 200 of the sheet-like type which, normally, are arranged on the conveyor belt element 106 resting on one of the larger extension surfaces, closing—as a result—a large number of through openings 116 depending on their size. In particular, by using the protruding elements 140, it is unlikely that the preferential gas flow path in the tunnel chamber 104 will be significantly changed when some characteristics of the items 200, such as size or arrangement thereof on the conveyor belt element 106, are changed.

Figure 8:
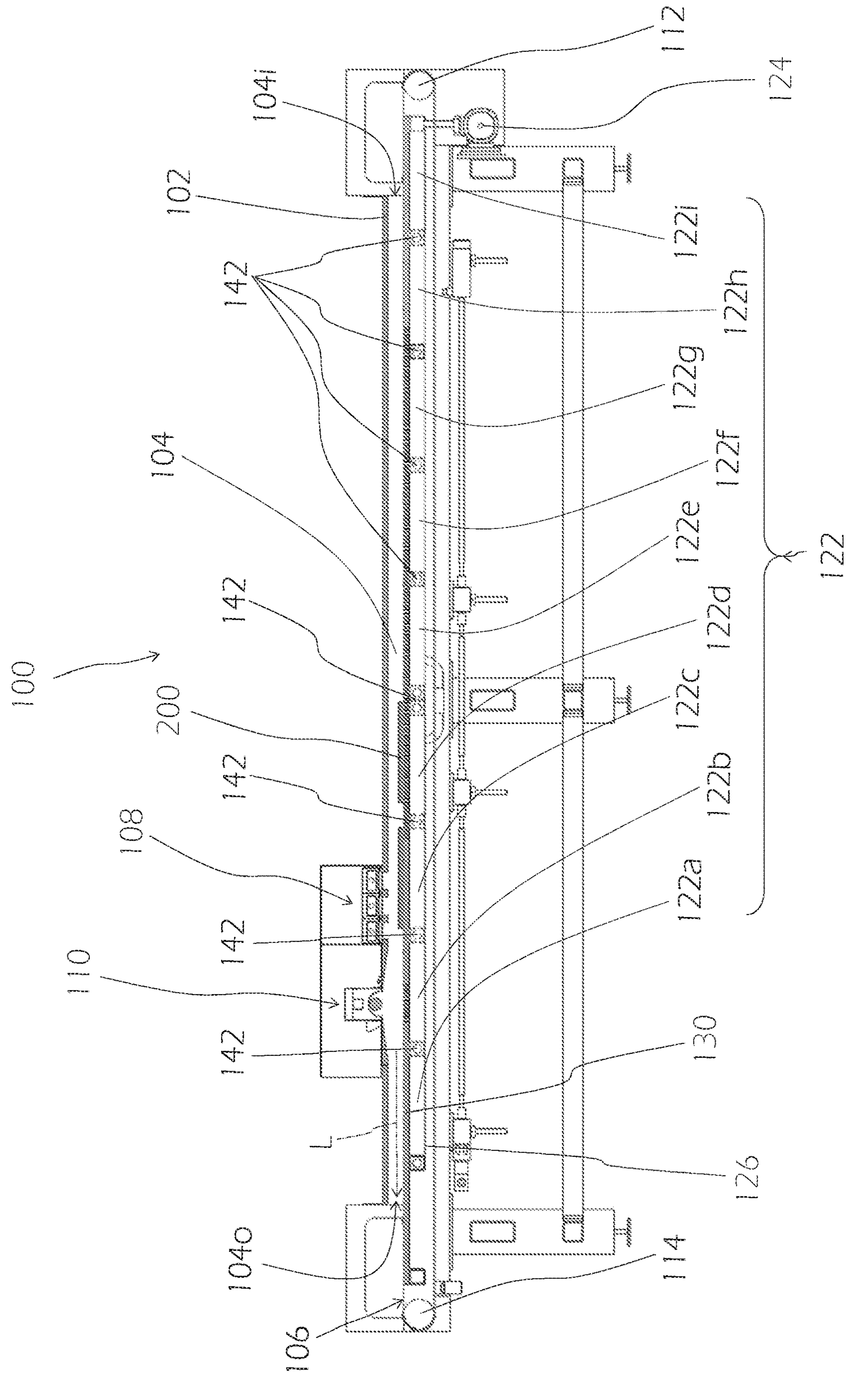
FIG. 8 is a longitudinal cross-section of an apparatus according to a third preferred embodiment of the present invention.

FIG. 8 shows a longitudinal cross-section of an apparatus 100, in a third embodiment, which is similar to the longitudinal cross-section shown in FIG. 3, of the first embodiment, except for the structure of the suction chamber 122. In particular, in this second preferred embodiment, the suction chamber 122 is defined by a plurality of sub-chambers **122*a*, 122*b*, 122*c*, 122*d*, 122*e*, 122*f*, 122*g*, 122*h*, 122*i*, which are in fluid communication with each other through fluid connection means 142, and each of the sub-chambers is in fluid communication with the tunnel chamber 104 through none or some of the plurality of through ducts 128**.

The fluid connection means 142 may be partitioning walls that are perforated and mutually arranged inside the suction chamber 122 so as to define the sub-chambers **122*a*, 122*b*, 122*c*, 122*d*, 122*e*, 122*f*, 122*g*, 122*h*, 122*i***, keeping them in fluid communication with each other (for example arranging them in series).

Alternatively, the fluid connection means 142 may be formed by a hollow frame whose structure defines the sub-chambers **122*a*, 122*b*, 122*c*, 122*d*, 122*e*, 122*f*, 122*g*, 122*h*, 122*i*, which are maintained in fluid communication with each other through holes connecting the frame cavity and the sub-chambers. In this case, the suction means 124** are preferably fluidly connected directly to the cavity of the frame.

In this state, a homogeneous inert gas distribution and an absence of turbulence are advantageously further guaranteed given that, at the design stage, the degree of suction of the gases from the tunnel chamber 104 through the suction chamber 122 can be adjusted. In particular, with this configuration the corresponding volume and/or number of through ducts 128 can be selected for each of the sub-chambers **122*a*, 122*b*, 122*c*, 122*d*, 122*e*, 122*f*, 122*g*, 122*h*, 122*i*, to maintain a desired degree of suction depending on their position with respect to the tunnel chamber 104**.

Figure 9:
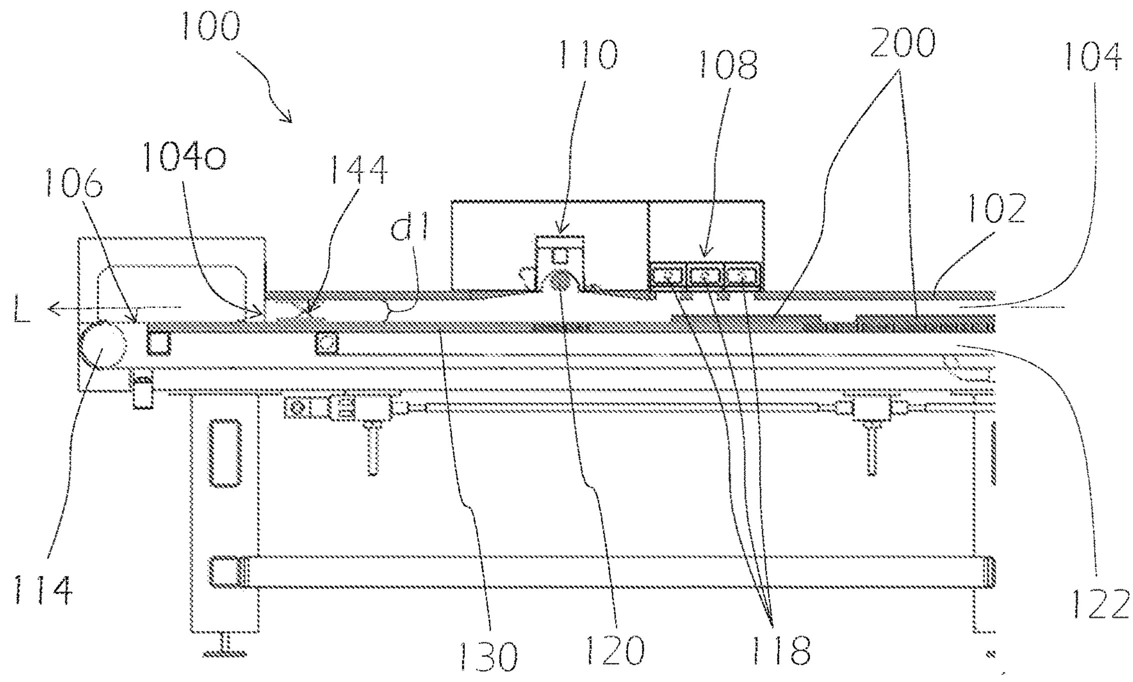
FIG. 9 is a first portion of a longitudinal cross-section of an apparatus according to a fourth preferred embodiment of the present invention.
Figure 10:
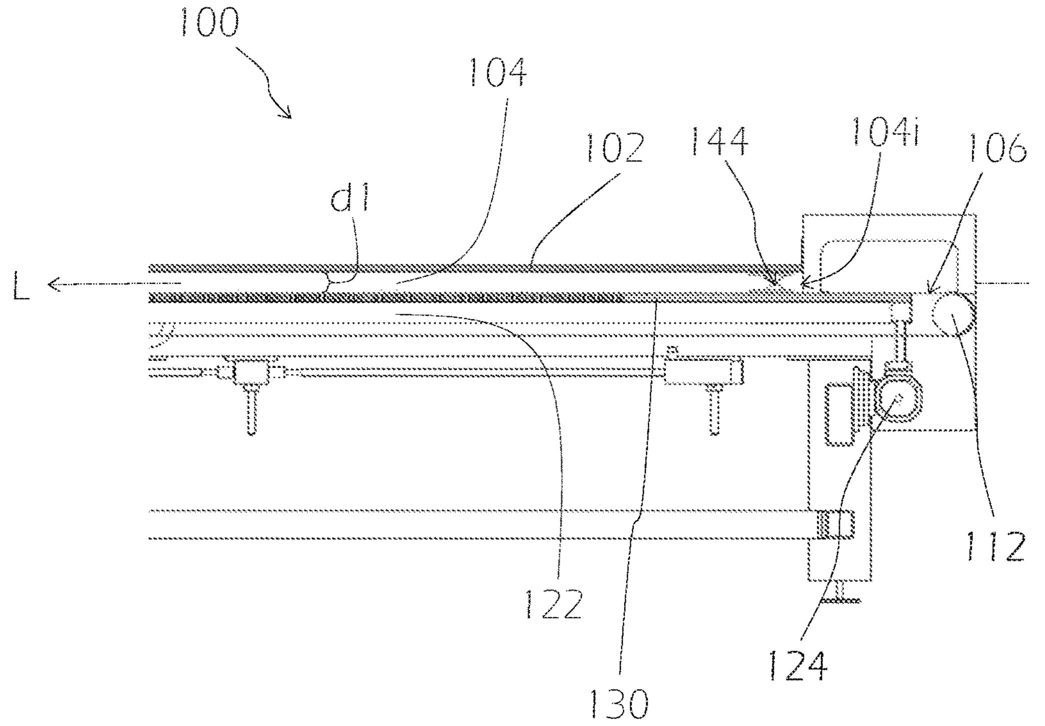
FIG. 10 is a second portion of the longitudinal cross-section of the apparatus according to a fourth preferred embodiment of the present invention.

FIGS. 9 and 10 show portions of a longitudinal cross-section of an apparatus 100, in a fourth embodiment, which is similar to the longitudinal cross-section shown in FIG. 3, for the first embodiment, except for the structure of the covering element 102. In particular, in this fourth preferred embodiment, the apparatus 100 comprises adjustment means 144 configured to adjust a distance dl between the conveyor belt element 106 and the covering element 102 so as to adjust the volume of the tunnel chamber 104.

The adjustment means 144, such as a pantograph lifting system, screw lifting system or the like, allow to change the dimensions of the tunnel chamber 104 so as to select them depending on the size of the items 200 and to the free-volume which is to be maintained under operating conditions. In particular, by lowering the covering element 102 toward the conveyor belt element 106 at a reduced distance from the items 200, a small free-volume is left in the tunnel chamber 104 which makes the removal of oxygen more effective under the same inert gas flow conditions by means of the first 118 and second 134 injection means.

In this state, a greater efficiency in the consumption of the inert gas and an increased versatility of use of the apparatus 100 are advantageously guaranteed.

The apparatus 100, according to the present invention, is particularly advantageous for carrying out a treatment, preferably opacifying, of items 200, preferably sheet-like, on whose surfaces there is applied chemical product which can be photopolymerized/dried, preferably acrylic monomers/oligomers-based, by means of a radiation emitter having wavelength/s in the ultraviolet spectral region, preferably a lamp which emits radiation having a wavelength comprised between 165 and 200 nm, more preferably 172 nm by means of a xenon lamp.

The method comprises the following steps:

a) applying the chemical product to the surfaces of items 200, preferably by means of roller coating, web coating, spray coating or the like;
b) optionally gelling the chemical product, preferably by means of radiation having wavelength/s in the ultraviolet spectral region;

c) introducing the items 200 coated with the chemical product inside the apparatus 100 according to the present invention, so as to remove oxygen from the items 200 and treat the chemical product in inert atmosphere by means of radiation by the radiation emitter;

d) transporting the opacified items 200 outside the apparatus 100, in a natural atmosphere;

e) optionally, drying the opacified items 200 by means of a device arranged downstream of the apparatus 100.

In the light of the above, it is clear that significant results were achieved, overcoming the drawbacks of the state of the art, allowing to make an apparatus 100 adapted to effectively and reliably carry out a controlled atmosphere treatment of a chemical product applied to surfaces of items 200.

In particular, the apparatus 100 is adapted to provide a controlled atmosphere having a high inert gas percentage content.

Furthermore, the apparatus 100 is adapted to provide a homogeneous and regular inert gas distribution in the tunnel chamber 104 in which the items 200 are treated.

Furthermore, the apparatus 100 provides for a construction that allows wide ranges of setting of the process parameters, so as to optimise them depending on the production requirements, while at the same time maintaining an effective and reliable treatment of the items 200.

Lastly, the apparatus 100 provides for a construction that allows wide range and simple design options.

Naturally, the materials and equipment used to implement the present invention, as well as the shape and dimensions of the individual elements, may be the most suitable depending on the specific requirements.

The invention claimed is:

1. Apparatus for the treatment of a chemical product applied to surfaces of items, said apparatus comprising:

a covering element defining a tunnel chamber, the tunnel chamber being configured to allow the items to be transported through the tunnel chamber by a conveyor belt element, a first injection passage configured to supply inert gas in said tunnel chamber, radiation means configured for the treatment inside said tunnel chamber of said chemical product by radiation, a suction chamber in fluid communication with said tunnel chamber, suction means fluidly connected to said suction chamber, wherein said suction chamber is in fluid communication with said tunnel chamber through a plurality of through ducts formed on a wall element separating said chambers, said wall element being arranged so that said conveyor belt element is configured to be operatively at least partially interposed between said items and said plurality of through ducts, and said conveyor belt element being provided with a plurality of through openings which pass through its thickness, wherein the suction means, the wall element and the conveyor belt element are configured such that at least a part of the inert gas is suctioned from the tunnel chamber into the suction chamber through the plurality of through openings of the conveyor belt element and the plurality of through ducts of the wall element.

2. The apparatus according to claim 1, wherein said conveyor belt element comprises a plurality of protruding elements extending from its surface, said protruding elements being operatively adapted to support said items keeping the latter spaced from said plurality of through openings.

3. The apparatus according to claim 1, wherein said first injection passage is arranged upstream of said radiation means with respect to a transport direction of said items in said tunnel chamber by said conveyor belt element.

4. The apparatus according to claim 1, wherein said plurality of through ducts is arranged upstream of said radiation means with respect to the transport direction of said items in said tunnel chamber by said conveyor belt element.

5. The apparatus according to claim 1, wherein said wall element is configured so that said plurality of through ducts comprises a first ducts group arranged at or upstream of said radiation means and at least one second ducts group distinct from said first ducts group.

6. The apparatus according to claim 5, wherein said wall element is configured so that said at least one second ducts group is arranged upstream of said first injection passage, and said first ducts group and said at least one second ducts group being formed on said wall element so that between them there is a continuous wall portion of said wall element which is free from through ducts.

7. The apparatus according to claim 1, further comprising a second injection passage configured to supply inert gas in said tunnel chamber, said radiation means comprising a radiation emitter and a reflector element adapted to reflect the radiation towards the surfaces of said items on said conveyor belt element in said tunnel chamber, wherein said reflector element is interposed between said radiation emitter and said second injection passage and further provides for passage means configured for allowing entry of the inert gas from said second injection passage in said tunnel chamber through said reflector element.

8. The apparatus according to claim 1, wherein said radiation means comprise a radiation emitter.

9. The apparatus according to claim 1, wherein said suction chamber is defined by a plurality of sub-chambers in fluid communication with each other.

10. The apparatus according to claim 1, wherein a distance between said conveyor belt element and said covering element is adjustable so as to adjust a volume of said tunnel chamber.

11. The apparatus according to claim 1, wherein the wall element is arranged within a loop of the conveyor belt element.

* * * * *